United States Patent [19]

Masuda et al.

[11] Patent Number: 5,315,431
[45] Date of Patent: May 24, 1994

[54] OPTICAL ISOLATOR

[75] Inventors: Akihiro Masuda; Ikuo Maeda; Hideaki Yuri; Yoichi Suzuki, all of Shizuoka, Japan

[73] Assignee: Fuji Electrochemical Co., Ltd., Tokyo, Japan

[21] Appl. No.: 997,745

[22] Filed: Dec. 30, 1992

[30] Foreign Application Priority Data

Apr. 20, 1992 [JP] Japan ................... 4-126763

[51] Int. Cl.⁵ ............................ G02B 5/30; G02F 1/09
[52] U.S. Cl. .................................. 359/281; 359/484; 359/495; 372/703
[58] Field of Search ............. 359/281, 282, 283, 484, 359/494, 495, 496, 497; 372/703

[56] References Cited

U.S. PATENT DOCUMENTS 4,548,478 10/1985 Shirasaki .
4,852,962 8/1989 Nicia .................... 359/484
4,909,612 3/1990 Scerbak et al. ........... 359/484

FOREIGN PATENT DOCUMENTS 61-58809 12/1986 Japan .

*Primary Examiner*—Martin Lerner
*Attorney, Agent, or Firm*—Keck, Mahin & Cate

[57] ABSTRACT

A non-reciprocal unit and a parallel-surfaced flat birefringent plate are provided between incident side and outgoing side fiber collimators. The non-reciprocal unit is formed by disposing two tapered birefrigent plates, one on each side of a 45° Faraday rotator consisting of a cylindrical permanent magnet and a magneto-optical element housed in the magnet. The optical axes of the parallel-surfaced flat birefringent plate and adjacent tapered birefringent plate are staggered from each other by 90°. The thickness of the parallel-surfaces birefringent plate is set equal to the sum of the thicknesses of the two tapered birefringent plates.

5 Claims, 1 Drawing Sheet

OPTICAL ISOLATOR

BACKGROUND OF THE INVENTION

The present invention relates to an optical device such as an optical isolator or an optical modulator, and more particularly to improvement in a polarization-independent optical isolator provided with fiber collimators on both sides of a non-reciprocal unit using tapered (wedge-type) birefringent plates.

The present invention provides a non-polarization-mode-dispersing optical isolator adapted to eliminate the difference in velocity between the ordinary ray and extraordinary ray occurring on tapered birefringent plates, by inserting a parallel-surfaced birefringent plate between a non-reciprocal unit and one fiber collimator in a polarization-independent isolator. This optical isolator is useful for, especially, the long distance, high speed communication.

As generally known, an optical isolator is a non-reciprocal optical device having a function of allowing the passage of light in one direction and preventing the passage thereof in the opposite direction, and used in large quantities for shutting off the reflected return light sent out from an optical part in an optical fiber communication system.

An optical fiber communication system used practically at present employs a system for sending out information from an output side with the intensity of light modulated, and detecting at a reception side the intensity of an optical signal by a direct light detecting method and then demodulating the information. Regarding the long distance communication using, for example, a submarine cable, an attempt has been made for transmitting a directly amplified optical signal by utilizing a plurality of optical fiber amplifiers incorporated in the intermediate portions of an optical cable. When such a method is employed, a number of optical isolators are required.

Various types of optical isolators have been developed. The optical isolators suitably incorporated in the above-mentioned optical cable include an optical isolator of the type which is provided with incident side and outgoing side fiber collimators on both sides of a non-reciprocal unit and does not depend on a plane of polarization as disclosed in Japanese Patent Publication No. 61-58809/1986 and corresponding U.S. Pat. No. 14,548,478. The non-reciprocal unit referred to above has a unitary combination of a 45° Faraday rotator, and two tapered birefringent plates sandwiching the rotator therebetween. These tapered birefringent plates are arranged with the optical axes thereof staggered from each other at 45°.

In the forward direction, the parallel input rays from the incident side fiber collimator are separated into ordinary rays and extraordinary rays by a first tapered birefringent plate in a non-reciprocal unit, and a plane of polarization is turned in a 45-degree arc by a Faraday rotator, these two kinds of rays being turned into parallel rays by a second tapered birefringent plate, which parallel rays therefore enter an outgoing side fiber collimator. In the opposite direction, the reflected return light is also separated into ordinary rays and extraordinary rays by the second tapered birefringent plate, and a plane of polarization is turned in a −45° arc due to the non-reciprocity of the Faraday rotator. Out of the separated rays, the ordinary rays are converted into extraordinary rays, and the extraordinary rays into ordinary rays, by the first tapered birefringent plate. Therefore, the separated rays which have passed through the first tapered birefringent plate spread and do not become parallel rays, so that none of these rays enters the incident side fiber collimator. Thus, the passage of light in one (forward) direction is allowed but that of light in the opposite direction is prevented.

In the transmission of an optical signal in the forward direction by the optical isolator described above, the incident light is separated into ordinary rays and extraordinary rays in the non-reciprocal unit. Since the velocity of the respective rays is different, a transfer lag is about 0.85 picoseconds in terms of time difference when tapered birefringent plates consisting, for example, of monocrystalline rutile and having a thickness of their optical path passing portions of about 0.5 mm are used. In the outgoing side fiber collimator, the ordinary rays and extraordinary rays are synthesized, and, therefore, disorder (increase in the width of optical pulse) corresponding to the transfer lag occurs in the waveform of an optical signal.

The transfer lag of an optical signal caused by the difference in velocity (polarization mode dispersion) between the ordinary rays and extraordinary rays is relatively small in a single optical isolator. In fact, this transfer lag is negligible and it poses little problem at an optical communication speed of around 2.5 Gbit/s currently employed. However, since a great number of (about 50–150) optical isolators are incorporated in a long distance optical communication (optical communication using, for example, a submarine cable) system as described above, the turbulence of the waveforms of optical signals becomes large, so that, when such an optical system is operated at a high speed of for example, 10 Gbit/s, information transmission normally becomes difficult.

SUMMARY OF THE INVENTION

An object of the present invention is to provide an improved polarization-independent optical isolator.

Another object of the present invention is to provide a polarization-independent optical, isolator free from the drawbacks encountered in a conventional device and capable of minimizing polarization mode dispersion and the collapse and disorder of optical signals, and thereby attaining the accurate transmission of information in long distance, high-speed communication.

The present invention is directed to improvement in a polarization-independent optical isolator having a non-reciprocal unit in which wedge type or tapered birefringent plates are provided on both sides of a 45° Faraday rotator, and fiber collimators are positioned on both sides of the non-reciprocal unit. In the present invention, a parallel-surfaced flat birefringent plate is insserted between the non-reciprocal unit and one of the fiber collimators in such an optical isolator and the optical axes of the parallel-surfaced flat birefringent plate and adjacent tapered birefringent plate are staggered from each other at 90° to form a non-polarization-mode-dispersed optical isolator.

The materials for the tapered birefringent plates and the parallel-surfaced birefringent plate include, for example, monocrystalline rutile. The thickness of the parallel-surfaced birefringent plate is preferably set in such a manner that it becomes substantially equal to the sum of the thickness of the optical path passing portions of the two tapered birefringent plates. The parallel-surfaced birefringent plate may be provided on either side of the non-reciprocal unit.

When the light enters the non-reciprocal unit in the forward direction, it is separated into ordinary rays and extraordinary rays, which pass through the two tapered birefringent plates. Since the refractive indexes of the ordinary rays and extraordinary rays in a tapered birefringent plate are different, a difference in velocity occurs between the respective outgoing rays. When a parallel-surfaced birefringent plated the optical axis of which is staggered at 90° from the adjacent tapered birefringent plate, is provided on the outgoing side of the non-reciprocal unit, the ordinary rays are converted into extraordinary rays, and the extraordinary rays are converted into ordinary rays by this birefringent plate. The resultant rays pass through the parallel-surfaced flat birefringent plate. Therefore, the difference in velocity is eliminated, and non-polarization-mode-dispersed ordinary and extraordinary rays are sent out in parallel with each other. When the parallel-surfaced flat birefringent plate is provided on the incident side of the non-reciprocal unit, the incident light is separated into ordinary rays and extraordinary rays, and a difference in velocity of light occurs, which is eliminated in the non-reciprocal unit. After all, non-polarization-mode-dispersed ordinary and extraordinary rays are sent out in parallel with each other. If the thickness of the parallel-surfaced flat birefringent plate is set substantially equal to the sum of the thickness of the optical path passing portions of the two tapered birefringent plates in the non-reciprocal unit, the polarization mode dispersion can be eliminated substantially completely.

PREFERRED EMBODIMENTS OF THE INVENTION

Figure 1:
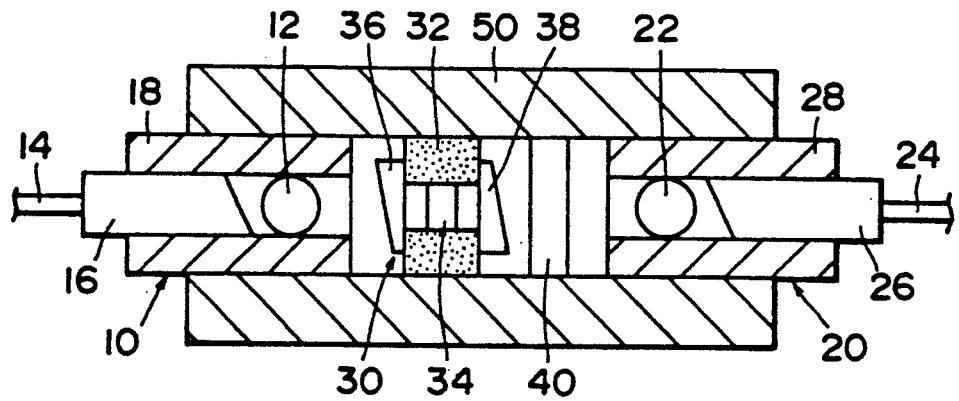
FIG. 1 is a sectional view of a non-polarization-mode-dispersing optical isolator embodying the present invention.

Referring to FIG. 1, a non-polarization-mode-dispersing optical isolator is formed by disposing a non-reciprocal unit 30 and a parallel-surfaced flat birefringent plate 40 between an incident side fiber collimator 10 and an outgoing side fiber collimator 20, and housing all of these parts in a cylindrical casing 50 and setting them firmly therein. In this embodiment, the parallel-surfaced flat birefringent plate 40 is provided on the outgoing side of the non- reciprocal unit 30. The incident side and outgoing side fiber collimators 10, 20 are substantially identical, and formed by holding spherical lenses 12, 22, and ferrules 16, 26 to which optical fibers 14, 24 are connected in metallic sleeves 18, 28.

The non-reciprocal unit 30 is formed by providing two tapered birefringent plates 36, 38, one on each side of a Faraday rotator in which a magneto-optical element 34 is housed in a cylindrical permanent magnet 32. The magneto-optical element 34 in this embodiment is formed, for example, of monocrystalline yttrium iron garnet. The tapered birefringent plates 36, 38 are formed, for example, of monocrystalline rutile, and are cut inciningly so that the optical axes thereof are in a perpendicular plane with respect to the rays of incident light.

The parallel-surfaced flat birefringent plate 40 is formed, for example, of monocrystalline rutile, and is cut so that the optical axis thereof is in a perpendicular plane with respect to the rays of incident light. The thickness of the birefringent plate 40 is substantially equal to the sum of those of the optical path passing portions of the two tapered birefringent plates 36, 38.

Figure 2:
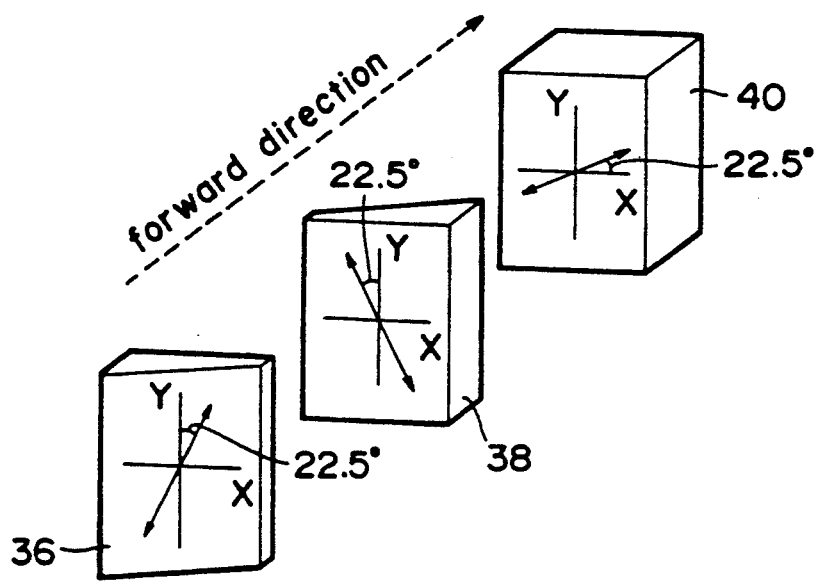
FIG. 2 is a diagram showing a relation between optical axes of two tapered birefringent plates and that of a parallel-surfaced flat birefringent plate.

In FIG. 2 in which the relation between the optical axes of the two tapered birefringent plates 36, 38 and parallel-surfaced flat birefringent plate 40 is shown, the birefringent plates 36, 38 are arranged so that the thick-walled portions and thin-walled portions thereof are opposed to each other, and the optical axes of the two tapered birefringent plates 36, 38 are staggered from each other at 45°. The optical axes of the parallel-surfaced flat birefringent plate 40 and tapered birefringent plate 38 are staggered from each other at 90°. Referring to FIG. 2 in which the incident side and outgoing side tapered birefringent plates 36, 38, respectively, taken in the forward direction (direction of a broken arrow) are shown, the optical axis of the incident side tapered birefringent plate 36 is inclined clockwise at 22.5° with respect to the Y-axis, while the optical axis of the outgoing side tapered birefringent plate 38 is inclined counter-clockwise at 22.5° with respect to the Y-axis. Therefore, these two optical axes are staggered from each other at 45°. The optical axis of the parallel-surfaced flat birefringent plate 40 is inclined counter-clockwise at 22.5° with respect to the X-axis, so that it is staggered at 90° from the optical axis of the outgoing side tapered birefringent plate 38.

The procedure of assembling the optical isolator is as follows. First, the incident side and outgoing side fiber collimators 10, 20 and the non-reciprocal unit 30 are prepared. The parallel-surfaced flat birefringent plate 40 is then regulated so that the optical axis thereof is staggered at 90°. This regulating operation can be carried out easily by passing polarized light through the non-reciprocal unit. The two fiber collimators are then installed, and the optical paths are regulated.

Figure 3:
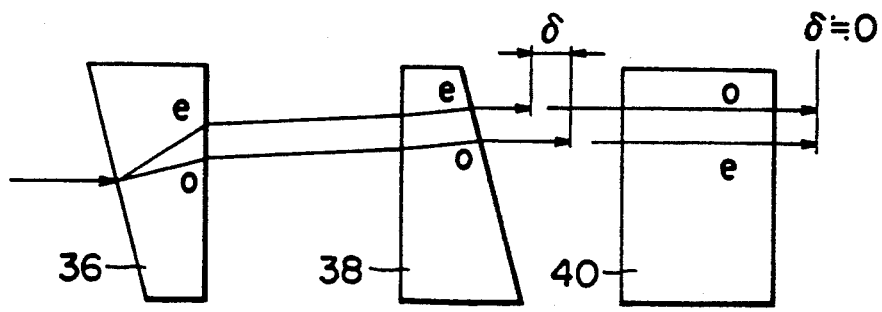
FIG. 3 is a diagram explaining the occurrence and extinction of polarization mode dispersion.

The operation of this optical isolator will be explained. Referring to FIGS. 1, 2 and 3 of the drawing, the forward direction is the direction extending from the left-hand portion of the drawing to the right-hand portion thereof. The incident light from the optical fiber 14 passes through the spherical lens 12 and enters the non-reciprocal unit 30. The incident light is separated into ordinary rays and extraordinary rays by the tapered birefringent plate 36, and the plane of polarization is turned at 45° by the Faraday rotator, the ordinary and extraordinary rays being turned into parallel rays by the tapered birefringent plate 38. Since the optical axis of the parallel-surfaced birefringent plate 40 is staggered at 90° from that of the tapered birefringent plate 38, the ordinary rays are converted into extraordinary rays, and the extraordinary rays into ordinary rays, in the parallel-surfaced flat birefringent plate 40. These rays are sent out as they are left in a parallel-extending state, and condensed on the optical fiber 24 through the spherical lens 22. The reflected return light advancing in the opposite direction is separated into ordinary rays and extraordinary rays by the parallel-surfaced flat birefringent plate 40. When these rays enter the tapered birefringent plate 38, the ordinary rays are converted into extraordinary rays, and the extraordinary rays into ordinary rays, and the resultant rays pass through the same birefringent plate 38. The plane of polarization is then turned at 45° by the Faraday rotator in the direction opposite to the direction, i.e. forward direction in which the plane of polarization is turned in the previously-described case. In the tapered birefringent plate 36, the ordinary rays are refracted into extraordinary rays, and the extraordinary rays into ordinary rays. Consequently, the outgoing rays do not become parallel but spread, so that the spherical lens 12 cannot condense these rays on the optical fiber 14. Namely, the reflected return light is shut off. Thus, an isolation operation similar to a conventional isolation operation is carried out.

FIG. 3 shows the occurrence and extinction of polarization mode dispersion in the forward direction. As described above, the incident light is separated by the tapered birefringent plate 36 into ordinary rays (o) and extraordinary rays (e), which then pass through the same birefringent plate 36, and the ordinary rays and extraordinary rays pass the subsequent tapered birefringent plate 38 as they remain to be ordinary rays and extraordinary rays respectively. Since the refractive indexes of the ordinary rays and extraordinary rays are different in the birefringent plates, a difference in velocity of light occurs. When the birefringent plates are made of monocrystalline rutile, the refractive index $n_o$ of ordinary rays and the refractive index $n_e$ of extraordinary rays are 2.453 and 2.709, respectively, so that the ordinary rays advance more speedily than the extraordinary rays. If the thickness of the optical path passing portions of the tapered birefringent plates 36, 38 is about 0.5 mm, a difference $\delta$ in optical path between the ordinary rays and extraordinary rays at the time of leaving the non-reciprocal unit 30 becomes around 0.85 picoseconds in terms of time difference. In the parallel-surfaced birefringent plate 40, the velocity of the ordinary rays and extraordinary rays reverses, i.e., the delayed rays out of the separated rays advance at an increased speed, while the preceding rays advance at a decreased speed, so that the velocity difference between these rays becomes small. If the thickness of the parallel-surfaced flat birefringent plate 40 is set to about 1 mm (twice as large as the thickness of the tapered birefringent plate), the velocity difference is eliminated so that the difference ($\delta$) is nearly equal to zero ($\delta=0$), and polarization mode dispersion disappears. Namely, the disorder of the waveforms of optical signals at the time of passage through the optical isolator becomes minimal.

In this embodiment, the parallel-surfaced flat birefringent plate 40 is provided on the outgoing side of the non-reciprocal unit 30 in the forward direction, and it can be provided on the incident side as well of the non-reciprocal unit 30 in the forward direction. In such a case, the parallel-surfaced flat birefringent plate 40 is fixed in position, with the optical axis thereof staggered at 90° from that of the adjacent (i.e. the incident side) tapered birefringent plate. According to the present invention, the shapes of various optical parts and the construction of the casing in which these parts are held may be suitably modified.

According to the present invention, a parallel-surfaced flat birefringent plate is inserted between a non-reciprocal unit using tapered birefringent plates and one fiber collimator with the optical axis of the flat birefringent plate staggered at 90° from that of the adjacent tapered birefringent plate as described above. Therefore, the ordinary rays and extraordinary rays are converted into extraordinary rays and ordinary rays, respectively, in these tapered birefringent plates and parallel-surfaced flat birefringent plate, and a difference in velocity between the separated rays is eliminated, whereby the polarization mode dispersion can be minimized. Namely, a conventional polarization-independent optical isolator in which polarization mode dispersion generally occurs can be formed into a non-polarization-mode-dispersing optical isolator. This can minimize the collapse and disorder of optical signals passing through an optical isolator, and attain the accurate transmission of information in the long distance, and high-speed optical communication (for example, not lower than 10 Gbit/s).

What is claimed is:

1. A non-polarization-mode-dispersing optical isolator comprising:
   a cylindrical casing,
   a non-reciprocal unit, in said casing, having a 45° Faraday rotator and two tapered birefringent plates on opposite sides of said Faraday rotator,
   fiber collimators on opposite sides of said non-reciprocal unit,
       said fiber collimators including a first fiber collimator connected to a first optical fiber and a second fiber collimator connected to a second optical fiber, and
   a parallel-surfaced flat birefringent plate between said non-reciprocal unit and one of said fiber collimators,
   wherein said parallel-surfaced flat birefringent plate is fixed within said casing with an optical axis of said parallel-surfaced flat birefringent plate is staggered at 90° from an axis of an adjacent one of said tapered birefringent plate.

2. A non-polarization-mode-dispersing optical isolator according to claim 1, wherein said tapered birefringent plates and said parallel-surfaced birefringent plates are made of monocrystalline rutile, and a thickness of said parallel-surfaced birefringent plate is substantially equal to a sum of thickness of optical path passing portions of said tapered birefringent plates.

3. A non-polarization-mode-dispersing optical isolator according to claim 2, wherein said tapered birefringent plates are inclined so that optical axes of said tapered birefringent plates are positioned in a perpendicular plane with respect to an incident light.

4. A non-polarization-mode-dispersing optical isolator according to claim 1, wherein said fiber collimators includes an incident fiber collimator and an outgoing fiber collimator, each of said fiber collimators having a metal sleeve, a spherical lens and a ferrule in said metal sleeve.

5. A non-polarization-mode-dispersing optical isolator according to claim 1, wherein said Faraday rotator has a cylindrical permanent magnet and a magneto-optical element made of monocrystalline yttrium iron garnet.

* * * * *